United States Patent [19]
Ohlson

[11] Patent Number: 5,566,164
[45] Date of Patent: Oct. 15, 1996

[54] PRACTICAL MEANS FOR DIGITAL GENERATION AND COMBINATION OF A MULTIPLICITY OF CDMA/FDMA SIGNALS

[75] Inventor: John Ohlson, Mt. View, Calif.

[73] Assignee: Stanford Telecommunications, Inc., Sunnyvale, Calif.

[21] Appl. No.: 358,913

[22] Filed: Dec. 19, 1994

[51] Int. Cl.$^6$ .................................................. H04J 13/00
[52] U.S. Cl. ................................. 370/18; 370/21; 375/208
[58] Field of Search ................................... 370/18, 19, 20, 370/21, 22, 23, 58.1, 50, 49.5, 29, 30, 77, 95.1, 95.3, 95.2, 8, 9, 10, 113, 114, 11, 56, 57, 69.1, 94.3; 375/200, 202, 204, 205, 206, 207, 208, 209, 210, 300, 309, 227, 261, 260, 298, 320, 353; 380/34, 24, 33, 49; 455/33.1, 54.1, 13.3, 33.3, 37.1, 38.1, 53.1, 59, 60, 61, 62; 379/59; 371/43, 44

[56] References Cited

U.S. PATENT DOCUMENTS 5,309,474  5/1994  Gilhousen et al. ...................... 370/18

Primary Examiner—Douglas W. Olms
Assistant Examiner—Dang Ton
Attorney, Agent, or Firm—Jim Zegeer, Esq.

[57] ABSTRACT

A modulator system for generating a plurality of individual modulated RF signals and combining them and transmitting them in different frequency channels. The invention provides a practical method and apparatus for generating and combining a multiplicity of CDMA signals in several radio channels using digital circuitry. Further, several such band segments can be generated in parallel and combined to cover a large bandwidth. The invention generates this multiplicity of signals and combines them at baseband using all digital techniques. The advantage of this approach is a great simplification in hardware and improvement in reliability, as well as flexibility.

1 Claim, 3 Drawing Sheets

5,566,164

PRACTICAL MEANS FOR DIGITAL GENERATION AND COMBINATION OF A MULTIPLICITY OF CDMA/FDMA SIGNALS

BACKGROUND AND BRIEF DESCRIPTION OF THE PRIOR ART

It is often desired to generate a multiplicity of radio signals with similar modulation formats to be combined and transmitted from a single antenna. For example, the hub station (HS) of a star configured network may transmit signals on a number of different frequency channels. Each of these channels may have a multiplicity of signals that employ code division multiple access (CDMA). As an illustration, the 18-95 CDMA cellular standard forward link calls for a number of 1.25 MHz channels each containing as many as 64 orthogonal CDMA signals.

Further, the signals may be transmitted on multiple antennas to provide spatial diversity. In addition, in a satellite system, the antenna system may be duplicated so that more than one satellite can be addressed simultaneously.

The straight forward approach of generating individual modulated RF signals and combining them may result in very cumbersome hardware due to the large number of links.

OBJECTS OF THE INVENTION

The objects of the invention are to provide a practical method and apparatus for generating and combining a multiplicity of CDMA signals in several radio channels using digital circuitry. Further, several such band segments can be generated in parallel and combined to cover a large bandwidth.

SUMMARY OF THE INVENTION

In a star configured network the hub station must often generate a multiplicity of signals to be transmitted in several different frequency channels. The invention generates this multiplicity of signals and combines them at baseband using all digital techniques. The advantage of this approach is a great simplification in hardware and improvement in reliability, as well as flexibility.

DESCRIPTION OF THE DRAWINGS

The above and other objects, advantages, and features of the invention will become more apparent when considered with the following specification and accompanying drawings wherein.

DETAILED DESCRIPTION OF THE INVENTION

Figure 1:
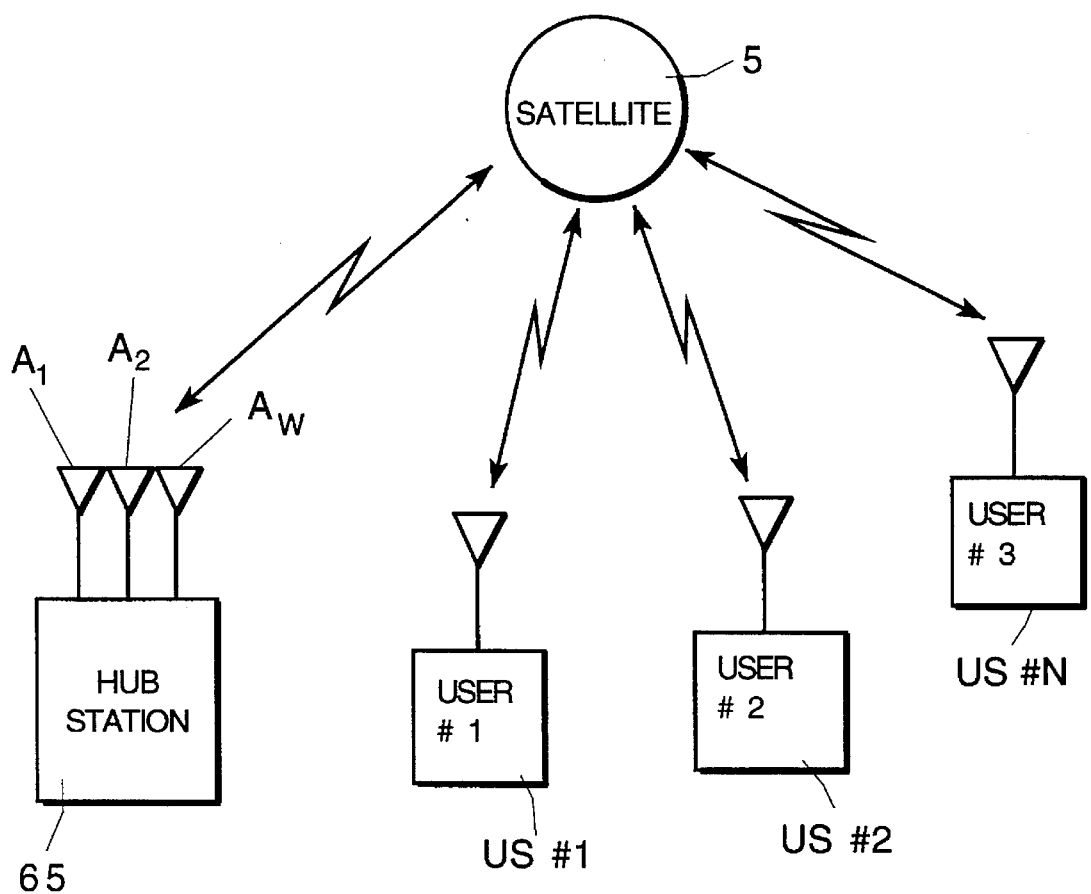
FIG. 1 illustrates a star configured spread spectrum satellite communication network incorporating the invention.

FIG. 1 illustrates a star configured spread spectrum satellite network. A satellite S transmits user signals from a hub ground station GS through the satellite S which transponds these to individual users U1, U2, U3 . . . UN on the ground.

In order to describe the invention in detail, the embodiment will be discussed as it applies to the forward link of a star configured spread spectrum satellite network. The satellite transmits user signals from a hub ground station (GS) through a satellite which transponds them to individual users on the ground. The forward link signals are assumed to be spread spectrum orthogonal CDMA (OCDMA) in nature, and occupying approximately 2.5 MHz. It is further assumed, for illustrative purposes, that as many as 256 CDMA signals may occupy one of the 2.5 MHz subbands. The GS transmits in several subbands. The GS "stacks" the various subbands into an appropriate bandwidth for transmission on the uplink to the satellite. Groups of subbands are then routed to different antenna beams or antennas on the satellite for transmission to individual users on the ground.

For this discussion, it is assumed that there are 98 subbands in a 300 MHz uplink bandwidth. Thus the GS has available a maximum of (256 users×98 subbands)=25,088 links for each satellite to be serviced. A GS would typically be capable of handling at least three satellites as well as having at least one redundant unit. Thus a typical GS might have available something over 100,000 links, There are generally many more links available than can be used due to power restrictions on the satellite. We will assume that the satellite can support a maximum of 9600 simultaneous voice links.

These signals are characterized by individually unique data, and amplitudes, as well as orthogonal overlay functions. Further, each 2.5 MHz subband is assigned two PN sequences for its 256 users. A doppler correction is also applied to each subband and each subband must be translated to its proper center frequency.

Figure 2:
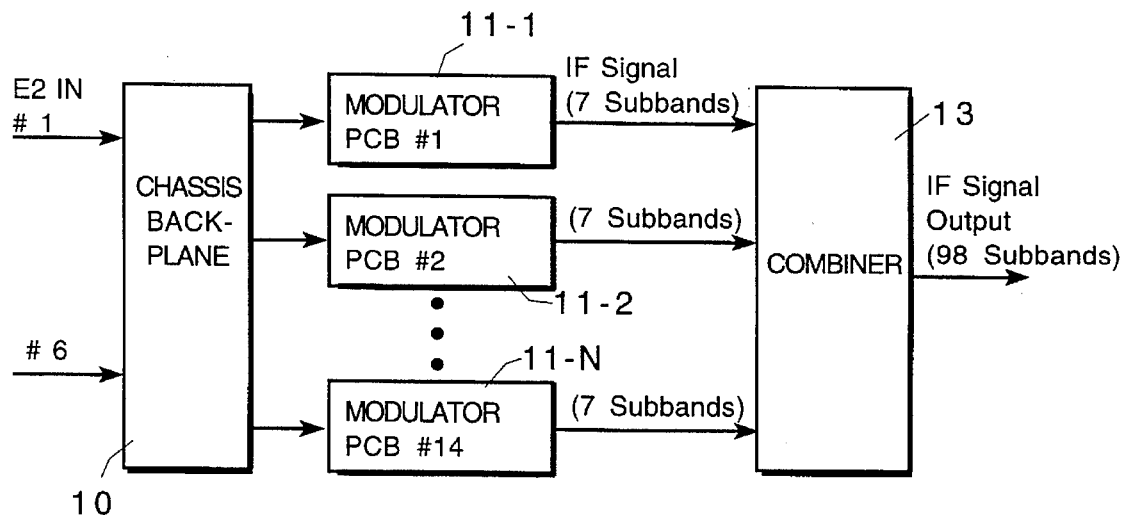
FIG. 2 is a block diagram of an embodiment of a modulator hardware configuration.

The overall structure of the signal switching and modulator hardware is shown in FIG. 2. The data is input on six standard E2 lines which are assumed to carry 1600 time division multiplexed (TDM) vocoded voice channels for a total of 9600 input voice channels. All six E2 lines are distributed to each modulator printed circuit board (PCB) on the backplane 10. Each modulator PCB 11-1, 11-2 . . . 11-N, is capable of demultiplexing up to 1792 of the input signals and generating the appropriately modulated signals in 7 subbands. The 7 subband frequency segment S1, S2 . . . SN is output from the modulator PCB at the appropriate place in the frequency "stack." The 14 modulator PCB outputs are thus combined in a passive combiner 13 to yield signals in a total of 98 subbands spaced over 300 MHz. This composite signal is amplified and routed to the appropriate selected antenna A1, A2 . . . AN.

Figure 3:
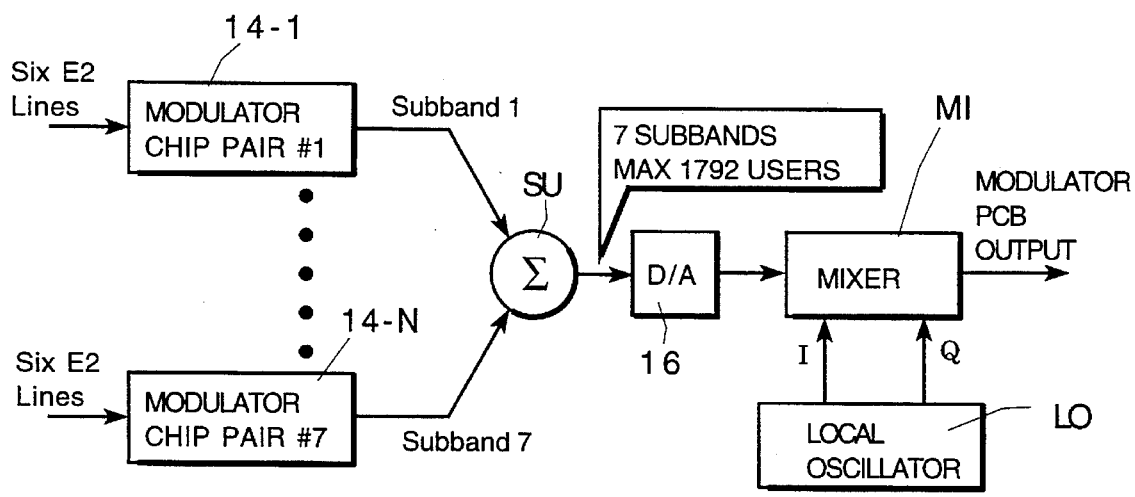
FIG. 3 is a functional block diagram of the modulator printed circuit board.
Figure 4:
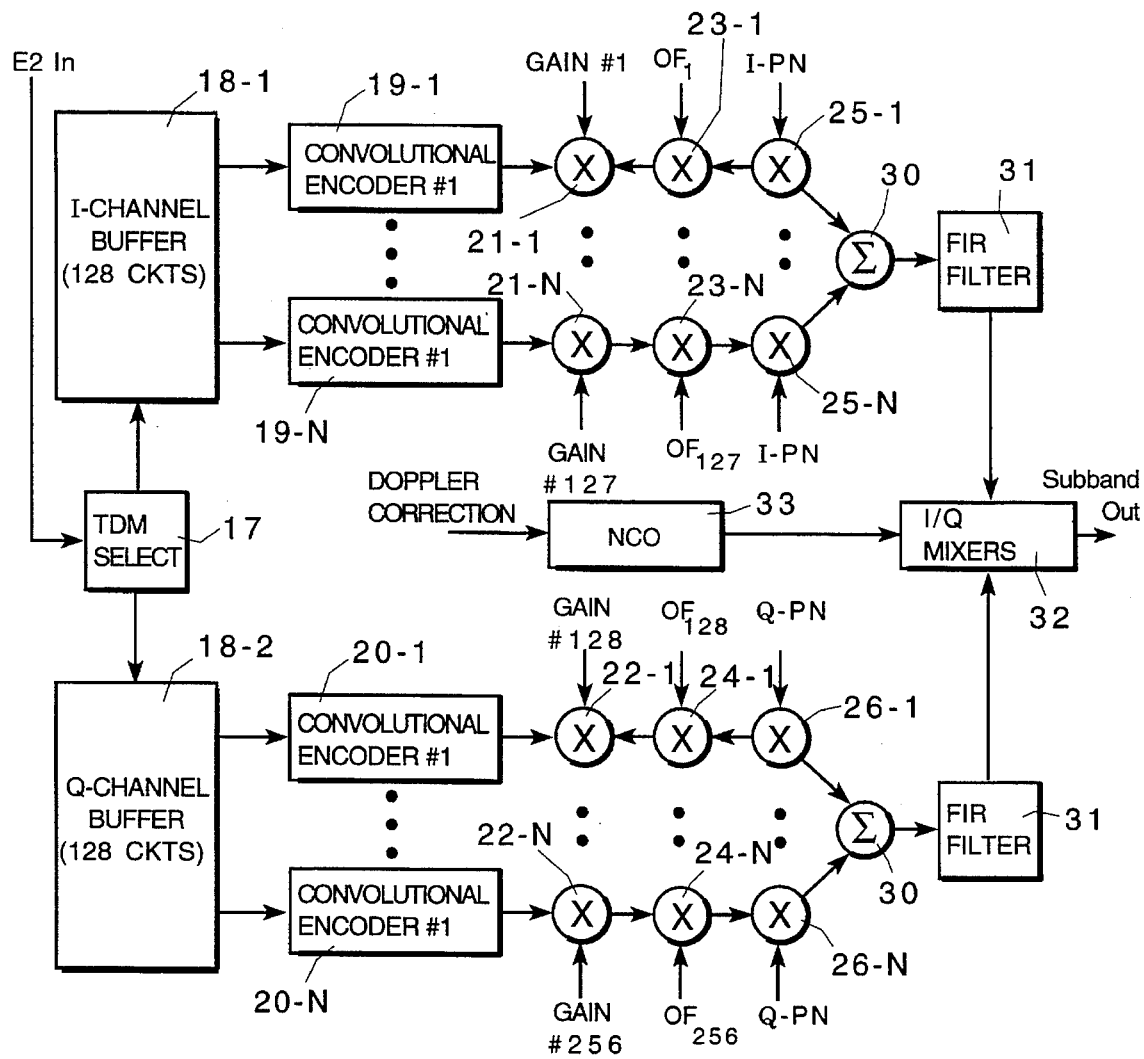
FIG. 4 is a functional block diagram of the modulator chip pair shown in FIG. 3.

A functional block diagram of the modulator PCB 11 is shown in FIG. 3. The PCB contains integrated circuits 14-1, 14-2 . . . 14-N, a pair of which is capable of generating the 256 signals required to fill each 2.5 MHz subband, respectively, and translate them to the appropriate place in the seven subband frequency segment. The individual subbands are summed digitally in summer SU and then converted to an analog waveform in digital to analog converter 16. The subband segment is then upconverted by mixer MI driven by local oscillator LO to its appropriate position in the 300 MHz spectrum. Details of a modulator chip 14 are shown in FIG. 4. Up to 256 input signals are demultiplexed by demultiplexer 17 from the input lines E2 and routed to buffers 18-1, 18-2. The individual signals are convolutionally encoded 19-1 . . . 19-N, 20-1 . . . 20-N and then are adjusted in amplitude in gain control circuits 21-1 . . . 21-N, 22-1 . . . 22-N if a power control algorithm is used. The resulting data signal is overlaid with an orthogonal function (Radamacher-Walsh) (RW) 23-1 . . . 23-N, 24-1 . . . 24-N as well as a PN code. As shown in FIG. 4, the composite group of signals is divided into two groups of 128 circuit channels. Each of these groups is overlaid with its own PN code 25-1 ... 25-N, 26-1 ... 26-N, summed 30, and then filtered with an finite impulse response FIR filter 31. These outputs are used to modulate 32 the in-phase (I) and quadrature (Q) components of a sinusoid to form the composite subband signal. This signal may be doppler corrected to compensate for antenna beam motion over the ground.

While a preferred embodiment of the invention has been described and illustrated, it will be appreciated that other embodiments, modifications, and adaptations of the invention will be readily apparent to those skilled in the art.

What is claimed is:

1. A modulator system for generating a plurality of individual modulated RF signals and combining them and transmitting them in several different frequency channels, comprising:

a plurality of data input lines, each data input line carrying a multiplicity of time division multiplexed (TDM) coded voice channels, a plurality of modulator chip pairs, each modulator chip pair being comprised of:

a) a demultiplexer means connected to receive said plurality of data input lines and demultiplex said TDM coded voice channels, b) at least a pair of modulators, each modulator being comprised of a buffer circuit connected to receive individual signals from said demultiplexer means, a plurality of parallel coding channels connected to said buffer circuits, respectively, each coding channel having convolutional encoder means for receiving said encoded individual signals from its associated said buffer circuit and convolutionally encoding same, a gain control circuit to selectively adjust the amplitudes of said individual signals, means for overlapping an orthogonal function and a pseudonoise PN code on said encoded individual signals, summer means connected to receive the outputs of each said coding channel and provide a modulator output signal, c) A finite impulse response FIR filter connected to said summer means providing FIR output signals, a source of carrier signal and means to modulate said FIR output signals on said carrier signal.

\* \* \* \* \*